June 10, 1969  H. L. BECKWITH  3,448,533
CUSHION INSOLE
Filed Jan. 18, 1968
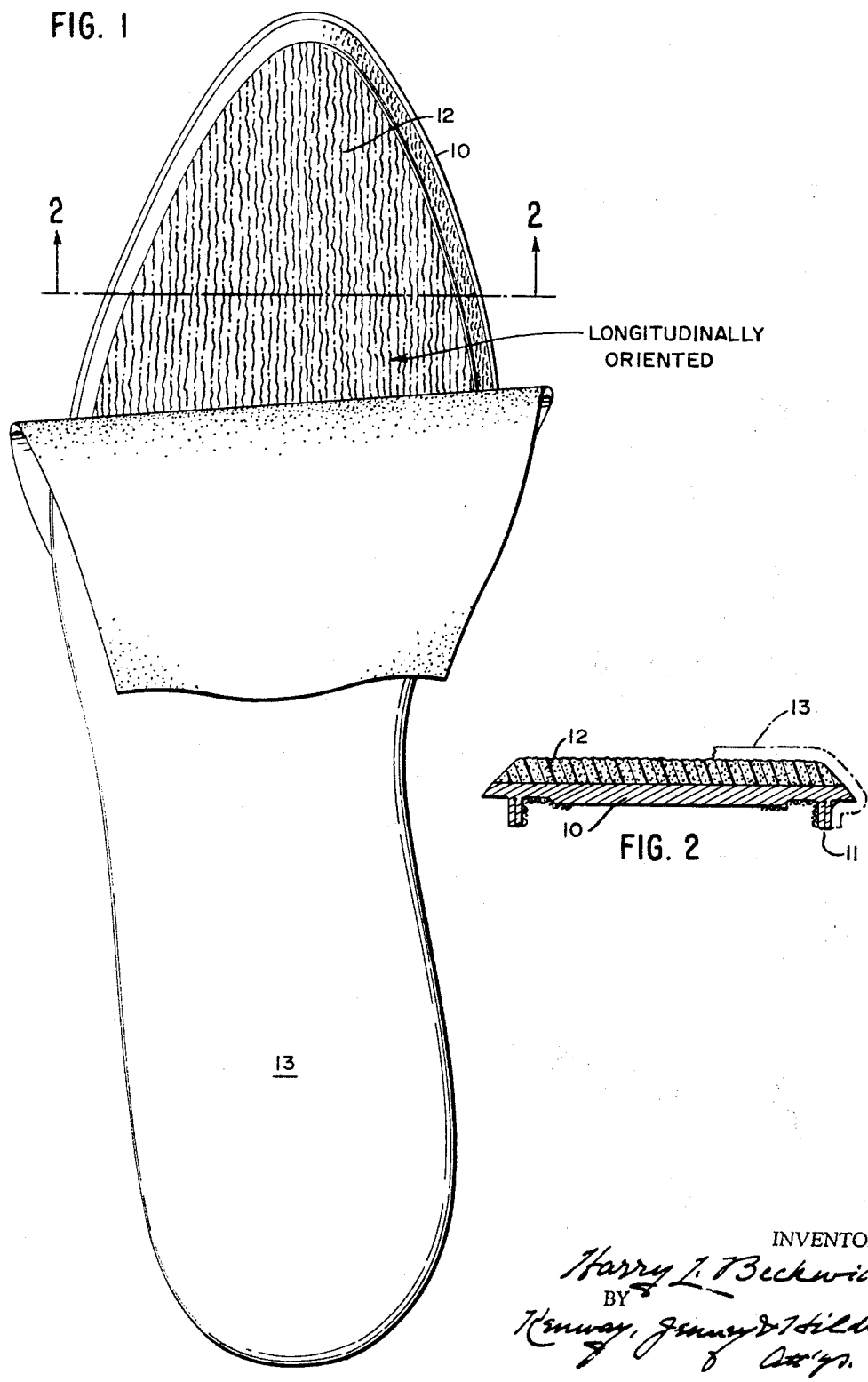
INVENTOR.
Harry L. Beckwith 3,448,533
CUSHION INSOLE
Harry L. Beckwith, Dedham, Mass., assignor to Beckwith-Arden Inc., Watertown, Mass., a corporation of New Hampshire
Filed Jan. 18, 1968, Ser. No. 698,889
Int. Cl. A43b 13/40
U.S. Cl. 36—44     3 Claims

ABSTRACT OF THE DISCLOSURE

A cushion insole comprising a resilient base ply and a cover enclosing a cushion ply composed of a foamed or blown ionomeric resin having its molecules longitudinally oriented in the insole.

---

This invention comprises a new and improved cushion insole and is based upon my discovery that a specific type of foamed or blown, closed cell thermoplastic material, which may be characterized as a thermoplastic resin polymer with ionic bonds, when used as a cushion material possesses of itself unforeseen and unpredictable advantages that combine to make it unique in this respect.

Specifically, I have found that an improved cushion material may be formed by extruding a layer or sheet of a thermoplastic hydrocarbon polymer resin having ionic bonds to form an integral cushion element. This material, which will be hereinafter referred to as in "ionomeric resin" due to the incorporation therein of ionic bonds in a thermoplastic polymer resin, may be more fully described as an ionic copolymer selected from the class consisting of polymers having the general formula $RCH=CH_2$ where R is a radical selected from the class consisting of hydrogen and alkyl radicals having from 1 to 8 carbon atoms, the olefin content of the polymer being at least 50 mol percent based on the polymer.

This material, which is now commercially available under the trademark "Surlyn A," a registered trademark of Du Pont, has surprising characteristics when utilized as a foamed, closed cell material with its molecules longitudinally oriented in the insole. It has a very high abrasion resistance, excellent recovery and freedom from creasing. It may be reduced by heat and pressure to any suitable thickness, will adhesively adhere when hot to other sheet material and by reason of the longitudinal orientation of its molecules it has a stiff longitudinal flexibility giving a springy effect in wear. In this aspect the cushion ply is decidedly stiffer in longitudinal flexing than in transverse flexing. In addition to these advantages the material may be readily secured in sheet form at moderate cost.

It is an object therefore of my invention to provide an improved cushion insole which may be readily fabricated at low cost from a foamed ionomeric resin.

Another object of my invention is to provide an improved resilient cushion element which may be easily incorporated into an insole as a permanent component thereof without the use of additional adhesives.

These and other features of the invention will be best understood and appreciated from the following description of a preferred embodiment thereof selected for purposes of illustration and shown in the accompanying drawings in which:

FIG. 1 is a plan view of the insole showing the flexible cover as partially removed, and FIG. 2 is a cross sectional view on the line 2—2 of FIG. 1.

As herein shown the insole comprises a base ply 10 of resilient sheet material such as fiberboard or other conventional insole stock. The base ply has preferably a beveled marginal edge and is provided with a welt sewing rib 11. This rib may be formed by channeling the base ply and turning up the lip and feather as shown, or a preformed rib may be adhesively attached to a flat base ply.

The cushion ply 12 is of a character not heretofore found in insoles but is composed of a sheet of the ionomeric polymer previously identified as "Surlyn A." In contour it coincides with the contour of the base ply 10 and its marginal edge is beveled in continuation with the angle of the base ply 10. The molecules of this material have been longitudinally oriented in the sheet. This orientation imparts to the material unique resilient features not heretofore found in cushion insoles. In some cases it has been found desirable to buff the cushion ply to remove any surface glaze and improve its adhesive attachment when applied under heat and pressure to the base ply 10.

In addition to the characteristics of this material already described it should be noted that it has low moisture absorbance, is sterile in respect to bacteria and capable of long wear without cold flow or permanent organic distortion.

Having assembled the base ply and the cushion ply 12 as suggested in FIG. 2 a flexible cover ply 13 is spread smoothly over the outer surface of the cushion ply 12 and wrapped over the marginal edges of the superposed plies 10 and 12. This is then permanently attached to the outer face of the rib 11 or to the flat heel seat portion of the ply 10 if the sewing rib does not extend to that portion of the insole.

The invention is herein shown as embodied in a cushion insole having the Goodyear welt sewing rib 11 but it will be understood that the novel Surlyn A material may be advantageously incorporated in a cushion insole design for use of other types of shoe such as Littleway or cement lasted.

Having thus disclosed my invention what I claim as new and desire to secure by Letters Patent is:

1. A cushion insole comprising a base ply of resilient sheet material, a superposed cushion ply of similar contour composed of foamed ionomeric resin, said cushion ply having similarly contoured marginal edges and having its molecules longitudinally oriented in the insole which is thereby rendered more flexible in widthwise flexing than in longitudinal flexing, and a flexing cover enclosing the cushion ply and being adhesively secured to the margin of the base ply.

2. A cushion insole as described in claim 1, further characterized in that the cushion ply is outwardly beveled forming a feather edge of reduced thickness which is adhesively secured to the margin of the resilient base ply.

3. A cushion insole as described in claim 1, further characterized in that the cushion ply is resiliently stiffer in longitudinal flexing than in transverse flexing.

References Cited

UNITED STATES PATENTS

| | | | |
|---|---|---|---|
| 2,658,288 | 11/1953 | Scholl | 36—44 |
| 2,784,502 | 3/1957 | Morali | 36—44 |
| 2,979,835 | 4/1961 | Scholl | 36—44 |
| 3,009,270 | 11/1961 | Nacht | 36—44 X |
| 3,126,650 | 3/1964 | Goldstein | 36—22 |

FOREIGN PATENTS

| | | |
|---|---|---|
| 215,076 | 4/1924 | Great Britain. |
| 301,686 | 10/1932 | Italy. |

ALFRED R. GUEST, Primary Examiner.

U.S. Cl. X.R.

36—22, 30